(12) United States Patent
MacLaren et al.

(10) Patent No.: US 10,579,470 B1
(45) Date of Patent: Mar. 3, 2020

(54) ADDRESS FAILURE DETECTION FOR MEMORY DEVICES HAVING INLINE STORAGE CONFIGURATIONS

(71) Applicant: Cadence Design Systems, Inc., San Jose, CA (US)

(72) Inventors: John M. MacLaren, Austin, TX (US); Carl Nels Olson, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 91 days.

(21) Appl. No.: 16/046,927

(22) Filed: Jul. 26, 2018

(51) Int. Cl.
*G06F 11/10* (2006.01)
*G06F 3/06* (2006.01)

(52) U.S. Cl.
CPC ........ *G06F 11/1016* (2013.01); *G06F 3/0619* (2013.01); *G06F 3/0659* (2013.01); *G06F 3/0673* (2013.01)

(58) Field of Classification Search
CPC ............ G06F 11/1012; G06F 11/1016; G06F 11/1048; G06F 11/1068; G06F 3/0619; G11C 29/42
See application file for complete search history.

(56) References Cited

U.S. PATENT DOCUMENTS 9,047,214 B1 * 6/2015 Northcott ............... G06F 11/108
2019/0034273 A1 * 1/2019 Srinivasan ........... G06F 11/1076

* cited by examiner

*Primary Examiner* — Shelly A Chase
(74) *Attorney, Agent, or Firm* — Schwegman Lundberg & Woessner, P.A.

(57) ABSTRACT

Various embodiments provide for a memory controller capable of detecting an error on addressing (address error or address fault) of memory commands for a memory device implementing an inline storage configuration of primary data with associated error checking data. According to some embodiments, the memory controller indicates that an address error of a particular memory command has occurred (or likely occurred) by detecting when a plurality of data errors is produced by a plurality of error checks performed on primary data resulting from the particular memory command. Various embodiments described herein allow both single-bit error detection and correction, and address protection to exist in a memory solution implementing an inline error checking data storage configuration, such as inline ECC storage configuration.

20 Claims, 8 Drawing Sheets

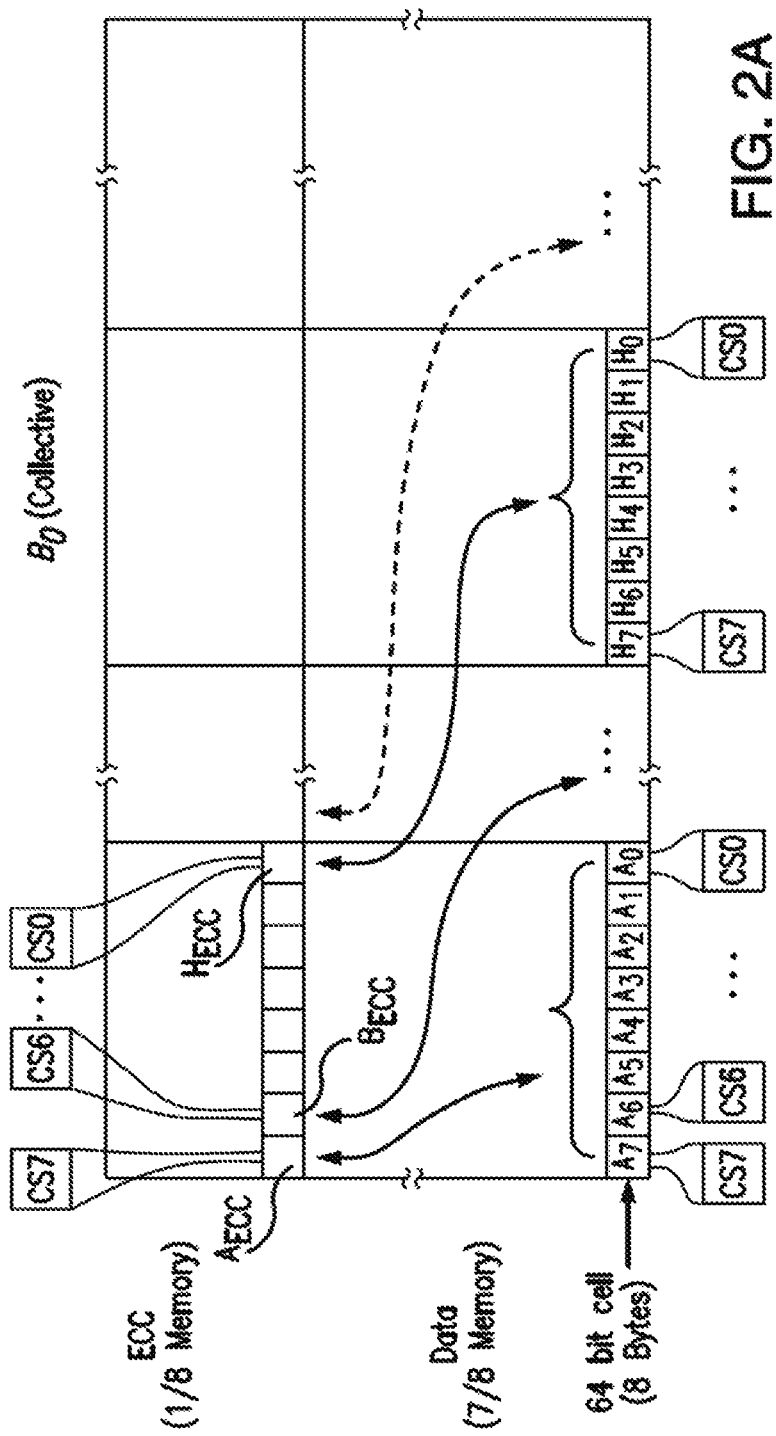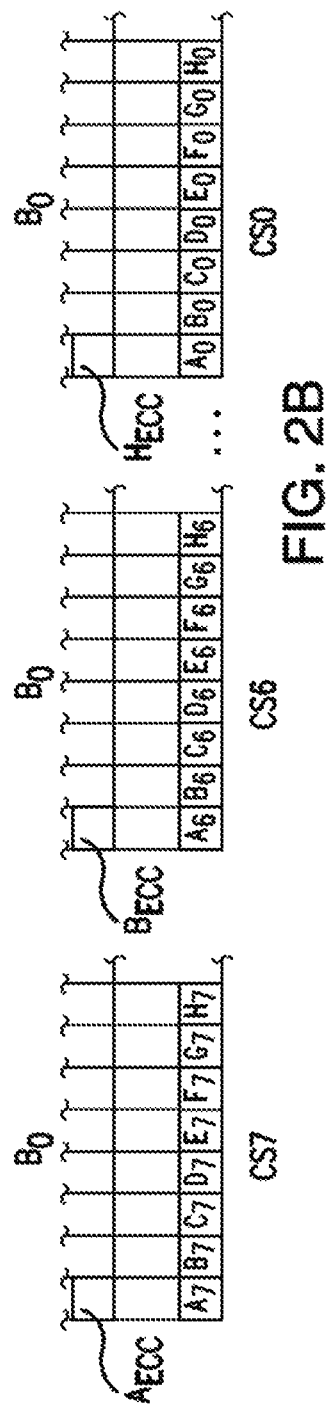
FIG. 2A
FIG. 2B

US 10,579,470 B1

ADDRESS FAILURE DETECTION FOR MEMORY DEVICES HAVING INLINE STORAGE CONFIGURATIONS

TECHNICAL FIELD

Embodiments described herein relate to memory and, more particularly, to systems, methods, devices, and instructions for detecting address failure for memory devices having inline storage configurations.

BACKGROUND

Memory controllers are generally circuits dedicated to controlling and managing the flow of data written to and read from one or more memory devices. They may be suitably formed as separate devices or integrated with a central processing unit or other main controller, and serve the memory storage and access needs of various software application operations. Memory controllers implement the logic to read from and write to various types of memory devices, examples of which include dynamic random access memory (DRAM), as well as electrically programmable types of non-volatile memory such as flash memory, and the like.

To minimize the consequences of data corruption due to random sources of error, various error checking measures for detection and/or correction are employed in the art for the storage and retrieval of data from memory devices. One example of the various known measures is the use of an Error Correcting Code (ECC) feature for detection or correction of error in data words read from one or more memory devices. An ECC feature is usually used in memory controllers for computing devices that are particularly vulnerable to data corruption, or for computing devices involved in high data rate or other applications where substantial immunity to data corruption is particularly important. ECC features generally involve adding redundant ECC bits to a transmitted data segment (e.g., transmitted to a memory device) according to a predetermined code (of a selected ECC format). These ECC bits are of parity-type, and permit the data segment to be properly recovered at the receiving end (by a receiving/recovery method suitably configured for the given ECC format), even if certain correctable errors were introduced in the transmission or storage of that data segment. The degree to which the errors are correctable would depend on the relevant properties of the particular code being used.

Memory controllers generally transmit, receive, and store data words, and a data word format may be defined by a multiple number of bytes. The multiple data bytes of each data word may be stored in a memory device formed by a plurality of integrated circuit chips, and each data byte may be stored in a different selectable chip of the memory device at the same relative address within each selectable chip.

Some memory controllers are configured for storage of such ECC-protected data according to a sideband ECC storage scheme (or format). A sideband scheme for storing ECC and data bits usually provides for an additional chip (e.g., an ECC chip) in which the ECC byte associated with a given data word's data bytes is exclusively stored. The data word's ECC byte is then stored much like its data bytes—at the same intra-chip address as those data bytes, but in its dedicated sideband ECC chip. For example, in some ECC-protected memory controller applications, a data word may be defined by 72 total bits, segmented into eight 8-bit data bytes and one 8-bit ECC byte (one ECC bit for each of the eight 8-bit data bytes). For such an example (a 72-bit data word formed by 8 data bytes plus 1 ECC byte), the data word is stored across nine selectable chips—eight selectable chips for the data bytes and one selectable chip for the associated ECC byte. Under the sideband ECC storage scheme, memory transactions for reading and writing data to and from memory devices contemplate and support sideband storage of ECC bytes with their associated data bytes (e.g., data words).

Other memory controllers may use a non-sideband ECC memory storage scheme, such as an ECC storage scheme (or format) where ECC-protected bytes are stored inline (along) with their ECC bytes in one or more chips available on a given memory device. For example, under an inline ECC storage scheme, a portion of the memory storage locations available on a chip of a memory device may be allocated for primary data bytes and the remainder allocated for ECC bytes so that the ECC bytes are stored inline with the primary data bytes. Additionally, a memory controller implementing an inline ECC storage scheme may adapt a memory transaction for inline storage configurations, where different portions of given data words are stored at different intra-chip addresses. In this way, available memory device chips may be shared for data and ECC bit storage according to a wide range of memory space configurations depending on such factors as data word size, the number and layout of available storage cells, and the like. An inline ECC storage scheme may be utilized when ECC protection for memory transactions exists but a memory device is not adequately equipped or configured to support sideband storage of ECC bytes. For example, an inline ECC storage scheme (or feature) can provide ECC protection similar to a sideband ECC memory storage scheme without the sideband ECC memory storage scheme's need to widen the memory data path between a memory controller and a memory device to communicate ECC on dedicated pins alongside memory data (e.g., a 9-byte wide memory interface where 8 bytes of the memory are data and 1 byte is the ECC for the 8 bytes of data).

BRIEF DESCRIPTION OF THE DRAWINGS

Various ones of the appended drawings merely illustrate example embodiments of the present disclosure and should not be considered as limiting its scope.

FIGS. 2A and 2B illustrate one example of the numerous ways in which primary data is stored inline with error checking data, in accordance with some embodiments.

DETAILED DESCRIPTION

Figure 1:
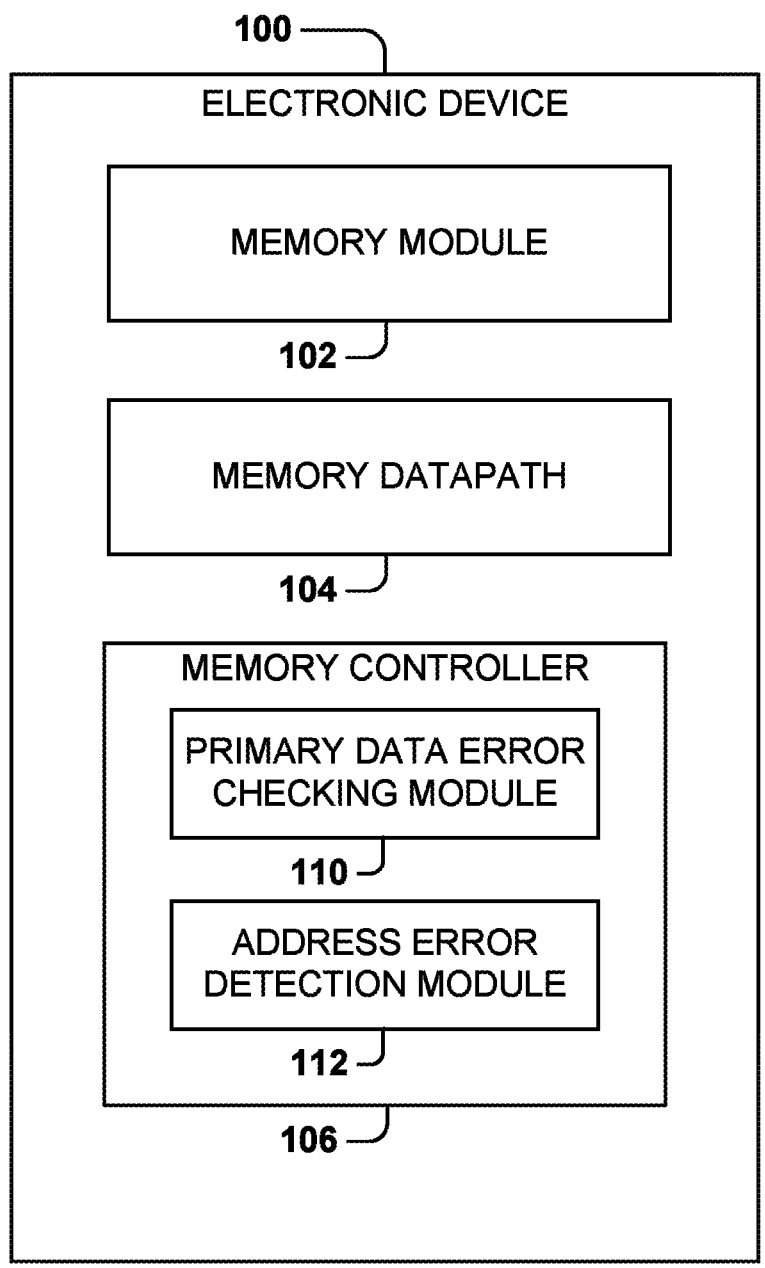
FIG. 1 is a block diagram illustrating an example electronic device that includes a memory controller, in accordance with various embodiments.

Utilizing inline storage of primary data with associated error checking data (e.g., ECC) can necessitate address protection. In particular, for a memory device implementing inline storage of primary data (e.g., user data bits) with error checking data (e.g., ECC data bits), when an address error (fault) occurs, primary data and error checking data should not match since they are handled as separate transactions with separate addresses. For example, since the memory device stores primary data and error checking data at different memory burst addresses that have a specific relationship, the memory device may detect a bit fault on one burst read command's address by detecting when the resulting primary data and error checking data bits (e.g., ECC bits) mismatch. Usually, having error checking data and primary data mismatch (e.g., ECC corresponds to primary data A, but primary data B is returned based on a faulty address) in a memory device implementing an inline storage configuration (e.g., inline ECC storage scheme) results in an uncorrectable error (e.g., ECC error), which is typically reported to a memory system as a fatal interrupt.

However, when an address error (or address failure) occurs and causes a mismatch between primary data and error checking data with respect to a memory device using inline storage configuration, the mismatch may still appear to match or to decode as a correctable error due to ECC aliasing. For instance, it is possible that due to an address error, a mismatch between primary data and error checking data results in multi-bit data errors that incorrectly appear to be correctable one-bit error (e.g., ECC error), which may then be reported to a memory system as a non-fatal interrupt (when it actually should be reported as a fatal interrupt). Memory devices that use a sideband storage configuration for error checking data (e.g., sideband ECC storage scheme) do not suffer a similar address aliasing issue since the primary data and error checking data for the sideband storage configuration are stored at the same memory address. Accordingly, an addressing error for inline storage configurations may incorrectly map to a single-bit error and, thus, render single-bit error correction unreliable. This can make fault detection on the address of read and write commands in a memory device implementing an inline storage configuration a challenge/problem. Additionally, overcoming this challenge/problem by simply disabling single-bit detection and handling single-bit errors the same as multi-bit error detection would not be a good solution because though multi-bit error detection would provide for single-bit detection, multi-bit error detection would not provide for single-bit error correction (and most errors that occur are correctable single-bit data errors). Various embodiments described herein address this challenge/problem (among others).

Various embodiments provide for a memory controller capable of detecting an error on addressing (address error or address fault) of memory commands (e.g., read or write memory commands) for a memory device implementing an inline storage configuration of primary data with associated error checking data. In particular, according to some embodiments, the memory controller indicates that an address error of a particular memory command has occurred (or likely occurred) by detecting when a plurality of data errors (e.g., ECC errors) is produced by a plurality of error checks performed on primary data resulting from the particular memory command. Various embodiments described herein allow both single-bit error detection and correction, and address protection to exist in a memory solution implementing an inline error checking data storage configuration, such as inline ECC storage configuration.

For example, according to a particular embodiment, a memory controller is provided that includes multi-ECC detection logic for detecting an address error/fault by combining a plurality of ECC responses generated by performing a plurality of ECC checks on data words of primary data resulting from a single memory transaction (e.g., a burst read command). For instance, for a single memory transaction comprising a burst memory read command that reads 64 bytes (512 bits) of primary data from a memory device (implementing an inline ECC storage scheme), 8 ECC checks may be performed for the 8 bytes of ECC data obtained in association with the 64 bytes of primary data. By combining together the plurality of ECC responses (e.g., of the 8 ECC checks) resulting for a single memory transaction and analyzing the combined result, the detection of multiple ECC errors in the primary data due to an address error/fault can be distinguished from a single ECC error in the primary data that is correctable and that is not a result of an address error/fault. Accordingly, various embodiments provide inline error checking data storage configuration (e.g., inline ECC storage configuration) with multiple data error detection (e.g., multi-ECC detection) that is capable of single bit error detection and correction, and capable of address error detection by distinguishing between single and multiple data errors in a larger transaction.

Various embodiments consider a single address error to occur when all of the primary data and error checking data (e.g., ECC data) are mismatched, and operate under the assumption that it is unlikely that all mismatched primary data and error checking data (e.g., ECC data) would result in a "correct" or "single-bit correctable" error being detected during an error check. This assumption is especially true when the primary data being error checked, using mismatched error checking data, comprises a memory burst worth of data. In other words, for various embodiments, getting more than one data error within a burst memory transaction while using inline error checking data storage configuration is likely an indication of an error on the addressing of read and/or write commands because there is a low probability that multiple single or multi-bit fault should occur in a single transaction.

For instance, it is likely that a burst memory read of primary data (e.g., resulting in 64 bytes of primary data), when error checked using mismatched error checking data (e.g., 8 bytes of mismatched ECC data), would result in either a multi-bit error or multiple errors aliasing to single-bit errors being during associated error checks (e.g., ECC check). Accordingly, within the context of an inline error checking data storage configuration, the memory controller of various embodiments detects an address error or an address fault in response to detecting that a plurality of error checks performed on a data word of primary data (e.g., 64 bytes of primary data), using error checking data (e.g., 8 byte of error checking data) obtained in connection with the data word (e.g., obtained from an error checking data address range), result in a plurality of errors (e.g., all 64 bytes result in an error). For some embodiments, the number of single-bit error that are interpreted as an address error can be programmable (e.g., user defined). For instance, if the number is programmed to "3," three single-bit errors would be detected as an address error, while two or less single-bit errors would be assumed to be correctable data errors.

Additionally, some embodiments operate under the assumption that an address error will result in multiple single-bit errors (or multi-bit errors) and that it is unlikely that all aliasing will result in data that appears to be correct due to aliasing. Accordingly, the memory controller of various embodiments detects an address error or an address fault in response to detecting that a plurality of error checks performed on multiple data words of primary data (using error checking data obtained in connection with those data words) result in a plurality of errors when those data words result from back-to-back memory commands (e.g., back-to-back burst memory read commands). By detecting multiple data in this way, various embodiments can significantly increase the probability of an address error being detected.

The memory controller of some embodiments is capable of detecting one or more different scenarios of multiple data error (e.g., multi-ECC errors), where detection of at least one scenario would result in the memory controller indicating that a multiple data error exists. The following example scenarios are described with respect to an error-checkable data word. As used herein, an error-checkable data word comprises an amount or unit of primary data (e.g., 64-bit data word of user data) on which a single error check can be performed using associated error checking data (e.g., 8 ECC check bits associated with the 64-bit data word). The size of each error-checkable data word may be determined based on the memory data path width (DP) used by the memory system implementing the inline error checking data storage configuration. Accordingly, the number of error-checkable data words resulting from a given burst memory command may be determined based on the memory data path width (DP) and the burst-length (BL) supported by the memory system implementing the inline error checking data storage configuration.

One example multiple data error detection scenario includes detecting multiple data errors within a plurality of error-checkable data words of primary data resulting from a single memory command, where, in the plurality of error-checkable data words, two or more error-checkable data words each have a separate single-bit error detected. Another example multiple data error detection scenario includes detecting multiple data errors within multiple error-checkable data words of primary data that results from a plurality of memory commands (e.g., back-to-back memory commands, such as by a burst mode memory command), where, in the plurality of memory commands, each memory command results in its own sub-plurality of data words within the plurality of data words, and at least two of those sub-pluralities each have a single-bit error detected. For some embodiments, a given sub-plurality of data words cannot have more than a single-bit error (e.g., a given sub-plurality of data words has no more than one ECC error).

For some embodiments, inline error checking data storage configuration (e.g., inline ECC storage configuration) with multiple data error detection (e.g., multi-ECC detection) described herein is utilized with a memory device comprising Low Power DRAM, such LPDDR4 and LPDDR5.

As used herein, "primary data" may refer to data (e.g., user data) that is stored or to be stored on a memory device and that is intended to be checked or protected by error checking data. For various embodiments described herein, error checking data for primary data can include ECC data (e.g., ECC error check bits). A correctable error (e.g., correctable ECC error) may comprise a single bit error in primary data (e.g., a data word of primary data). An uncorrectable error (e.g., uncorrectable ECC error) may comprise double-bit error in primary data (e.g., a data word of primary data), which can be detected but not corrected. A multiple data error may comprise more than a single bit error (e.g., from data words resulting from a burst memory read command of primary data) that, according to various embodiments described herein, indicates that an address error or an address fault exists with respect to a memory command (or indicates that there is a likelihood of an address error/fault exists).

As used herein, a memory burst command/operation (or burst mode memory command/operation) may refer to a command/operation that results in repetitious transmission of data a predetermined number of times to result in a memory data path width (DP) times burst length (BL) worth of data, without need to transmit each piece of data in a separate transaction (e.g., a single memory burst read command for a typical central processing unit (CPU) fetches a cache line worth of data). For example, where memory burst command/operation has a burst length of 16 (BL=16) and a 16-bit data path width (DP=-16), a single burst command will result in transmission of 256-bits (32 bytes) of data by a single memory transaction, rather than multiple separate memory transactions (e.g., 16 separate 16-bit memory transactions). Accordingly, a memory burst read command/operation performed with respect to a memory device can result in the reading (e.g., fetching) of a predetermined number of data words stored on the memory device, and a memory burst write command/operation performed with respect to a memory device can result in the writing of a predetermined number of data words to the memory device. A data word can include a predetermined number of bytes (e.g., 8 bytes for a 64-bit data word or 4 bytes for a 32-bit data word).

As used herein, inline primary data addresses refer to memory addresses of a memory device that correspond to those segments of the memory device that store primary data on the memory device. Inline error checking data addresses refer to memory addresses of a memory device that correspond to those segments of the memory device that store error checking data on the memory device.

As used herein, an error checking data address range (e.g., ECC address range) may include all inline error checking data addresses associated with (e.g., that map to) a primary data memory transaction with respect to a range of inline primary data addresses on a memory device. For example, an ECC address range with respect to a memory device may include all inline error checking data addresses that correspond to error checking data, on the memory device, associated with a plurality of primary data memory burst transactions. For instance, with a primary data-to-ECC ratio of 8 to 1, an ECC address range may be associated with a single memory burst worth of ECC data on a memory device that covers 8 memory bursts worth of primary data on the memory device.

As used herein, an address error or an address fault with respect to a memory command can include where an inline primary data address being used with the memory command maps or translates to an incorrect inline error checking data address, thereby resulting in a mismatch between the primary data referred to by the inline primary data address and the error checking data referred to by the inline error checking data address. For some embodiments, a memory system interprets or treats an indication of an address error as a fatal error for the memory system.

As used herein, an error checking data address range boundary determines when one error checking data address range ends and another error checking data address range begins.

As used herein, an error checking data buffer (e.g., ECC data buffer) may comprise a single storage element that will store a single memory burst reading of error checking data (e.g., ECC data) stored on a memory device. For example, the data size of an electronic checking data buffer would be 32 bytes where a single memory burst reading of error checking data results in 32 bytes of electronic checking data being read from the memory device. Some embodiments use a plurality of error checking data buffers, where each error checking data buffer may be managed independently.

According to some embodiments, a memory device stores primary data inline with error checking data for that primary data at a predetermined primary data-to-error checking data ratio (e.g., primary data-to-ECC ratio). As noted herein, using an inline storage scheme for error checking data (e.g., ECC data) can provide error checking data (e.g., ECC) protection similar to a sideband memory storage scheme for error checking data without the sideband memory storage scheme's need to widen the memory data path between a memory controller and a memory device to communicate error checking data on dedicated pins alongside memory data. For instance, using an inline storage scheme for error checking data, available memory space of each chip of a memory device may be sectioned according to a predetermined primary data-to-error checking data ratio of 8 to 1, such that ⅞th of each chip's available memory space is dedicated for primary data bits, while ⅛th of the memory space is dedicated for error checking data bits (e.g., ECC bits). This can facilitate error checking data protection similar to a sideband memory storage scheme for error checking data that uses a 9-byte wide memory interface between a memory controller and a memory device and where 8 bytes of the memory are primary data and 1 byte is the error checking data for the 8 bytes of primary data.

Additionally, for some embodiments, each bit of error checking data (e.g., ECC data) may be associated with error checking/protecting multiple bits of primary data. For instance, 1 byte of error checking data (e.g., ECC data) may error check/protect 8 bytes of primary data, which corresponds to an 8 to 1 primary data-to-error checking data ratio (e.g., primary data-to-ECC ratio). Certain embodiments may have a different primary data-to-error checking data ratio than those discussed herein.

For some embodiments, each read command to the memory device is performed as a memory burst command/operation and, as such, a read command to error checking data (e.g., ECC read command) is performed as a single memory burst command/operation resulting in an amount of error checking data equal to a data path times burst length of the single memory burst command/operation (e.g., 32 bytes of ECC data for DP=16 and BL=16). Accordingly, based on the primary data-to-error checking data ratio used by a memory device to store primary data inline with associated error checking data, a single memory burst read of the error checking data from the memory device results in error checking data corresponding to multiple continuous memory burst reads of the primary data from the memory device. For example, for a memory device using a primary data-to-ECC ratio of 8 to 1 for inline storage of primary data with ECC data, a single memory burst read of ECC data stored on the memory device can fetch ECC data that corresponds to (e.g., error checks or protects) 8 aligned memory burst reads of the primary data.

Though various embodiments are described herein with respect to a memory controller, it will be appreciated that for some embodiments, another controller or processing device may include address error detection features described herein.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram illustrating an example electronic device 100 that includes a memory controller 106 with error checking data caching, in accordance with various embodiments. The electronic device 100 may comprise any electronic device that uses a memory and a processor, such as a central processor unit (CPU) or a graphics processing unit (GPU). For instance, the electronic device 100 may comprise, without limitation, a computer (e.g., a server computer, a client computer, a personal computer (PC), a tablet computer, a laptop computer, a netbook), a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any electronic device capable of executing instructions with respect to a memory.

As shown, the electronic device 100 includes a memory module 102, a memory datapath 104, and the memory controller 106, which performs error checking data caching operations in accordance with various embodiments. Any one or more of the modules described may be implemented using hardware (e.g., one or more circuits) alone or a combination of hardware and software. Moreover, any two or more modules of the electronic device 100 may be combined into a single module, and the functions described herein for a single module may be subdivided among multiple modules.

To avoid obscuring illustrated embodiments with unnecessary detail, various functional components (e.g., modules) that are not germane to conveying an understanding of the illustrated embodiments have been omitted from FIG. 1. Various additional functional components may be supported by the electronic device 100 to facilitate additional functionality that is not specifically described herein.

The memory module 102 comprises one or more memory cells or memory devices, each of which may comprise some form of random access memory (RAM), such as Dynamic Random-Access Memory (DRAM) or Static Random-Access Memory (SRAM). The memory module 102 may be packaged as a single in-line memory modules (SIMM) or a dual in-line memory module (DIMM) that can be plugged into an electronic device including an appropriate socket. For some embodiments, the memory module 102 comprises Double Data Rate (DDR) Synchronous Dynamic Random-Access Memory (SDRAM), such as Double Data Rate 3 (DDR3), Double Data Rate 4 (DDR4), Low Power Double Data Rate 3 (LPDDR3), or Low Power Double Data Rate 4 (LPDDR4).

The memory datapath 104 comprises one or more electronic signal paths coupling together the memory module 102 and the memory controller 106 (e.g., individual lines between pins of the memory module 102 and the memory controller 106) such that data, address, command, control, clock, and other information can be carried between the memory module 102 and the memory controller 106. For example, the memory datapath 104 may comprise an interconnect, such as a link or a bus. Accordingly, the memory datapath 104 may carry one or more electronic signals between the memory module 102 and the memory controller 106. Among the electronic signals carried, the memory datapath 104 may carry one or more data signals for data to be written to, or read from, the memory module 102 (e.g., a memory device of the memory module 102). Additionally, the memory datapath 104 may carry one or more control signals, which can facilitate writing data to, or reading data from, the memory module 102 (e.g., a memory device of the memory module 102).

The memory controller 106 manages exchange of data to and from the memory module 102 via the memory datapath 104. To facilitate this, the memory controller 106 may exchange data, address, command, control, clock, and other information with the memory module 102 over the memory datapath 104.

The memory controller 106 uses split addressing to generate memory commands for memory transactions with respect to the memory module 102, and causes primary data to be stored inline with error checking data generated for the primary data on the memory module 102. For some embodiments, the primary data is stored on the memory module 102 at a range of inline data addresses, and the error checking data is stored on the memory module 102 at a range of inline error checking data addresses. For various embodiments, the range of inline primary data addresses does not overlap with (is disjointed with respect to) the range of inline error checking data addresses.

As shown, the memory controller 106 includes a primary data error checking module 110 and an address error detection module 112. According to various embodiments, the primary data error checking module 110 implements or facilitates error checking an error-checkable data word of primary data (64 bits of user data) using associated error checking data (e.g., 8 ECC data bits). To perform error checking, the primary data error checking module 110 may use a suitable error detection and correction technique, such as one that employs ECC of a predetermined format (e.g., a format of SECDED type), to detect an error in an error-checkable data word. For a given error-checkable data word, the primary data error checking module 110 may error check the given error-checkable data word and produce an error checking result for the given error-checkable data word, which may indicate, for example, no error, a single-bit error, a single-bit correctable error, and a single-bit uncorrectable error, a multi-bit uncorrectable error. For a plurality of error-checkable data words, the primary data error checking module 110 may error check each error-checkable data word, thereby producing a plurality of error checking results corresponding to the plurality of error-checkable data words. As the memory controller 106 executes memory transactions and retrieves error-checkable data word(s) of primary data from the memory module 102 and associated error checking data (e.g., ECC data), the primary data error checking module 110 can error check the retrieved error-checkable data word(s) using the associated error checking data. The memory transaction may comprise at least one of a read memory transaction, a write memory transaction, or a read-modify-write memory transaction. Additionally, memory transaction may comprise at least one burst memory command (e.g., burst memory read command that reads eight 64-bit error-checkable data words of primary data).

According to various embodiments, the address error detection module 112 indicates an address error with respect to a memory address (e.g., inline primary data address) used by a memory transaction. For some embodiments, a memory transaction executed by the memory controller 106 causes retrieval of a plurality of error-checkable data words of primary data, and particular error checking data associated with the plurality of data words, from the memory module 102. Each error-checkable data word retrieved may, for example, comprise 64 bits of primary data, and the associated error checking data may comprise 8 bits of error checking data (e.g., 8 ECC data bits). Of the plurality of error-checkable data words retrieved from the memory module 102, each error-checkable data word is error checked by the primary data error checking module 110, thereby producing a plurality of error checking results corresponding to the plurality of error-checkable data words. Based on the plurality of error checking results, the address error detection module 112 can determine whether the plurality of error checking results indicates at least one multiple data error condition that indicates that an address error or an address fault exists with respect to the memory transaction (or indicates that there is a likelihood of an address error/fault existing).

As noted herein, one multiple data error condition of interest may include where the memory transaction comprises a single memory command that causes the retrieving of the plurality of error-checkable data words from the memory module 102, and where each of two or more error-checkable data words, in the plurality of error-checkable data words, has at least a single-bit error. Such a multiple data error condition can provide, for example, coverage for a multiple data error (e.g., multiple ECC errors) existing in a single user word that comprises a plurality of error-checkable data words and that results from a single memory command. In such an example, a multiple data error should be indicated because any multiple data error is more likely to be an address error/fault rather than a data error/fault (e.g., corrupted error-checkable data words). To determine that such a multiple data error condition exists, the address error detection module 112 may combine together (e.g., by logical OR operation(s)) the plurality of error checking results to produce a combined error checking result, and count the number of correctable errors and uncorrectable errors in the combined error checking result. As also noted herein, each of the error checking results (in the plurality of error checking results) may comprise one of no error, a correctable error, and an uncorrectable error.

Another multiple data error condition of interest may include where the memory transaction comprises a memory command that causes the retrieving of the plurality of error-checkable data words from the memory device, where the plurality of error-checkable data words at least includes a first sub-plurality of error-checkable data words and a second sub-plurality of error-checkable data words, and where each of the first and second sub-pluralities of the error-checkable data words has at least a single-bit error. Such a multiple data error condition can provide, for example, coverage for a single-bit data error (e.g., multiple ECC errors) existing in a different user word that results from a burst memory command, where each user word comprises its own plurality of error-checkable data words. In such an example, a multiple data error should be indicated because a single-bit data error in two or more different user words can indicate an address error/fault with respect to all of the error-checkable data words retrieved by the burst. For some embodiments, each sub-plurality of error-checkable data words is retrieved by a single memory command (e.g., single read command) associated with a burst memory command (e.g., burst read command). To determine that such a multiple data error condition exists, the address error detection module 112 of some embodiments saves the combined error checking results for each of the last X number of sub-pluralities of error-checkable data words (e.g., last X number of user words) that had valid error checking data (e.g., valid ECC data). X may be determined based on the maximum number of sub-pluralities (e.g., maximum number of user words) supported (e.g., retrieved) by a single burst memory command for a memory system (e.g., DRAM burst for a memory configuration). The address error detection module 112 may save the last X number of combined error-checking results to a shift register, and shift bits in the shift register on clocks where an error checking result indicates valid error checking data (e.g., valid ECC data exists) for an error-checkable data word. The newest bit stored in the shift register may be the logical OR of all error checking results (e.g., indicating no error, corrected single-bit error, uncorrected single-bit error or uncorrected multi-bit error) for each sub-plurality of error-checkable data word (e.g., each user word). The address error detection module 112 may indicate a multiple data error (e.g., multiple ECC error) if any bits in the shift register are set for the X previous error checks (e.g., X previous user words error checked using valid ECC data) and the current error check (e.g., of the current sub-plurality of error checkable data words) indicates a single-bit error (e.g., corrected or uncorrected single-bit error) or multi-bit error. Using a shift register in this manner can enable some embodiments to implement a rolling detection window for detecting the multiple data error condition noted above, and can further enable such embodiments to avoid tracking memory transactions to determine existence of the multiple data error condition noted above.

Based on the determining that the plurality of error checking results indicate at least one multiple data error condition of interest, the address error detection module 112 may indicate an address error (or likelihood of an address error) with respect to the memory transaction based on the determining whether the plurality of error checking results indicates a multiple data error condition. For some embodiments, the address error detection module 112 may concurrently monitor for more than one multiple data error condition of interest, and the existence of at least one multiple data error condition of interest may be sufficient for the address error detection module 112 to indicate an address error with respect to the memory transaction. The existence of a multiple data error condition of interest may be expressed by an interrupt that may be asserted when the condition exists.

FIGS. 2A and 2B illustrate one example of the numerous ways in which primary data (referenced as "Data" in FIG. 2A) is stored inline with error checking data (referenced as "ECC" in FIG. 2A), in accordance with some embodiments. In this example, a 72-bit data word is employed, but with a memory device having just the eight chips CS0-CS7 available to provide the memory space (i.e., lacks benefit of a ninth dedicated sideband chip for ECC data). In the interests of brevity and clarity, the storage of Data and ECC bytes with reference to one bank, namely bank $B_0$, of the chips CS0-CS7, is schematically illustrated. As shown, the available memory space of each chip is sectioned according to a predetermined data-to-ECC ratio. In the illustrated case, a data-to-ECC ratio of 8 to 1 is employed with DRAM chips CS0-CS7, such that $7/8^{th}$ of each chip's available memory space is dedicated for data bits, while $1/8^{th}$ of the memory space is dedicated for ECC bits. In this sense, the available memory space is logically 'partitioned' to store ECC bits in that part of memory not accessible for storage of Data bits. These dedicated partitions, or sections/regions, of memory storage cells may be selectively defined at mutually offset locations in terms of pages and/or banks within a shared chip set.

Although other ratios may be employed depending on the requirements of the particularly intended application, the 8-to-1 ratio illustrated can provide for convenient mutual offsetting of addresses between data and ECC bits stored on the same chip. Adding three digital high values (111) and shifting a row address by 3 bits, for instance, can provide a binary divide-by-8 effect for mapping ECC bits to a consistently offset storage address relative to their corresponding Data bytes.

FIG. 2B illustrates a physical storage scheme for Data and ECC bytes making up a set of data words. Memory data may be transmitted for various applications in bursts containing numerous data words, and this set of data words may, for instance, constitute the data words of the same burst. In the case of Data bytes, the eight Data bytes of each data word in this example may be physically stored in a suitable manner across matching cells of the available chips for convenient logical addressing. When the eight chips CS0-CS7 are available in the illustrated example, the 8-bit Data bytes making up each data word are stored beginning at parallel/matching bank, row, and column locations across the chips CS0-CS7. In FIG. 2B, the set of data words shown—data words A (formed by constituent data bytes $A_7$, $A_6$, $A_5$, $A_4$, $A_4$, $A_2$, $A_1$, $A_0$, in most significant to least significant byte sequence), B, . . . , H (formed by data bytes $H_7$-$H_0$)—may be stored in this way within the data section of the given bank.

For example, Data bytes $A_7$-$A_0$ of data word A may each be stored in the respective chips CS7, CS6, CS5, CS4, CS3, CS2, CS1, CS0 at the same matching bank $B_0$, row, and column locations on the memory device. The Data bytes of the next data word B likewise may be stored in the respective chips CS7-CS0 at the same matching bank $B_0$, row, and column locations of the memory device, but one column location over from the Data bytes of the preceding word A. The Data bytes of the other sample data words C—H are similarly stored at matching bank, row, and column locations on the memory device, successively located one column over from the preceding data word's Data bytes.

The 8-bit ECC bytes $A_{ECC}$, $B_{ECC}$, $C_{ECC}$, $D_{ECC}$, $E_{ECC}$, $F_{ECC}$, $G_{ECC}$, $H_{ECC}$, generated by a memory controller of an embodiment for the eight data words A-H, may be physically stored starting preferably from the same chip, bank, and column location aligned with the first stored data byte of the data word A (of the given burst), but offset in row location from that Data byte so as to be disposed in the adaptively established ECC section of the given bank. The ECC byte of the next data word B may then be stored in the same bank of the next chip over, at the first available column location (which matches the column location aligned with the Data byte of the first data word), but offset in row location so as to be disposed in the ECC section of the given bank of the given chip. The ECC bytes of the remaining data words C—H may be similarly stored at corresponding locations in successive ones of the other chips as shown. In certain applications, the bank location within the same chip may be offset as well, so as to optimize performance, since rows/pages of a given bank in many applications may be opened only one at a time.

FIG. 2A illustrates an example logical storage scheme reflecting the physical storage scheme shown in FIG. 2B. In this example, no bank offset is employed between the inline-stored Data bytes and their associated ECC bytes. When the distributed contents of bank $B_0$ across the chips CS0-CS7 of FIG. 2B are combined in the collective bank $B_0$ as shown, the data words A-H are effectively stored in successive 64-bit cells within a row of the data section defined in the collective bank $B_0$. The eight 8-bit ECC bytes $A_{ECC}$-$H_{ECC}$ associated with those data words A-H may be stored in the 64-bit cell mutually offset from the data word A, so as to be disposed in the ECC section defined in that collective bank $B_0$. Inline storage may progress in this manner with the Data and ECC bytes of the next set of data words.

Figure 3:
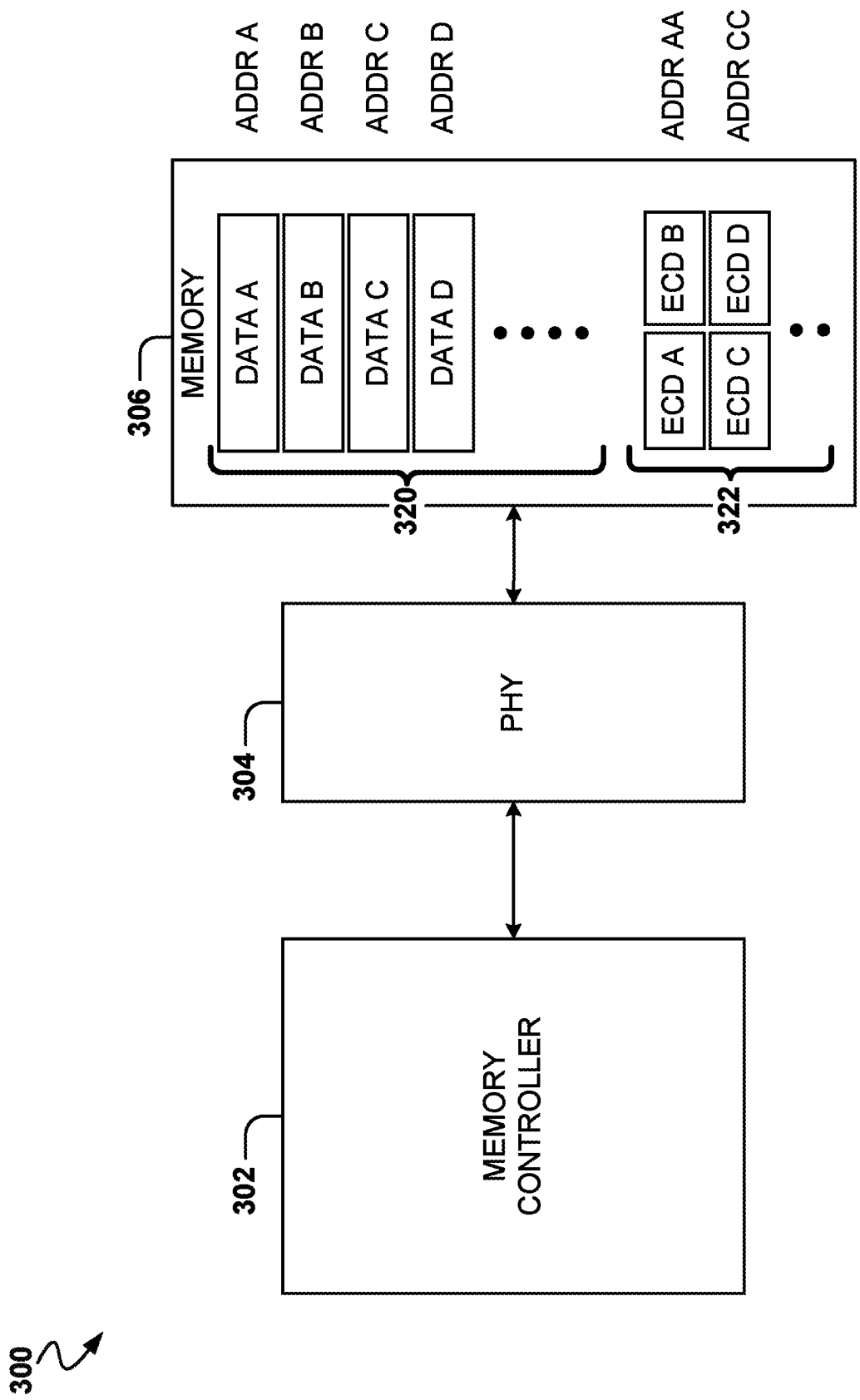
FIG. 3 is a schematic diagram illustrating an example memory system that includes an example memory controller, in accordance with some embodiments.

FIG. 3 is a schematic diagram illustrating an example memory system 300 that includes an example memory controller 302, in accordance with some embodiments. The memory system 300 also includes a physical interface (PHY) 304 and a memory 306 coupled to the memory controller 302 by way of the PHY 304. The memory 306 may comprise one or more memory devices of any suitable type and configuration known in the art, and the PHY 304 may be configured with a suitable interface standard known in the art for the memory 306. As illustrated, the memory 306 stores primary data 320 inline with error checking data 322 associated with the primary data 320. The primary data 320 and error checking data (e.g., ECC data) 322 store the memory 306 for a single memory transaction in two different locations in the memory 306, each of which may be accessed by independent memory commands.

Figure 4:
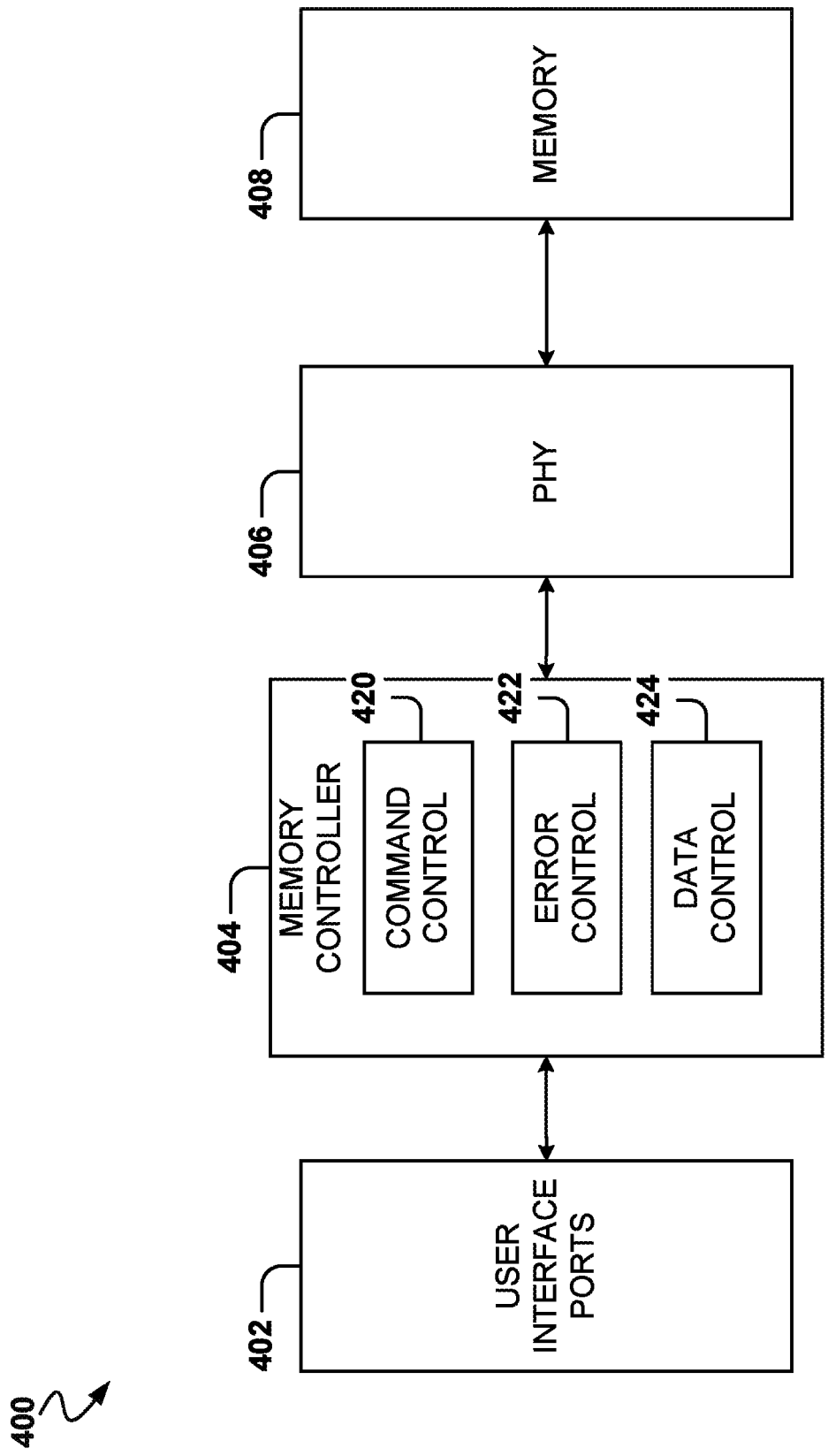
FIG. 4 is a schematic diagram illustrating an example memory system that includes an example memory controller, in accordance with some embodiments.

FIG. 4 is a schematic diagram illustrating an example memory system 400 that includes an example memory controller 404 with caching of error checking data, in accordance with some embodiments. As shown, the memory controller 404 can serve to provide control of a memory 408 (formed by one or more memory devices of any suitable type and configuration known in the art), which can support processing of a master control operation by a master controller (not shown). The memory controller 404 may communicate with a master controller through one or more user interface ports 402, and with the memory device(s) of the memory 408 through a physical interface (PHY) 406, which may be configured with a suitable interface standard known in the art for the memory 408.

The memory system 400 illustrated in FIG. 4 may be implemented in any known form, depending on the particular requirements of an intended application. For instance, the memory system 400 may be realized by discretely interconnected subsystems, or sufficiently integrated in the form of a system-on-chip (SOC) or the like, depending on the particular requirements of the intended application. As the user interface ports 402, the PHY 406, and the memory 408 may be of any suitable type and configuration known in the art, subject to the particular requirements of a given application, no further description is needed for description of features relating to the memory system 400.

In FIG. 4, the memory system 400 includes a command control portion 420, an error control portion 422, and a data control portion 424. In some embodiments, the data control portion 424 includes one or more digital circuits that implement functional logic to carry out a plurality of primary data access operations/commands on the memory 408. Such primary data access operations/commands may include, without limitation, read, write, masked write, and read-modify-write (RMW) operations/commands conducted on selectively addressed storage locations defined in the memory 408. The primary data access operations may include control of additional functions for proper interface with the particular type of memory device(s) employed in the memory 408.

For some embodiments, the error control portion 422 includes one or more digital circuits that implement functional logic for detecting and correcting errors in data segments as stored in memory 408. Additionally, for some embodiments, the error control portion 422 includes one or more digital circuits that implement functional logic for detecting one or more multiple data error conditions and causing the indication of an address error/fault with respect to a memory address used with a memory transaction based on detecting at least multiple data error conditions of interest. The error control portion 422 can include execution of error checking data processing, such as ECC processing of a predetermined code format (e.g., a format of SECDED type), to detect errors in a corrupted primary data segment read from the memory 408. The error control portion 422 is configured to correct the primary data segment read from the memory 408 having an error that is correctable with the given error checking data (e.g., ECC), and report (e.g., for the master control operation) those primary data segment errors which are detected but are not correctable with the given error checking data. The error control portion 422 can also provide intermediate storage of error checking data (e.g., ECC) bytes generated or read in association with primary data bytes during the execution of various primary data access operations, for cooperative transmission with their primary data bytes either to the PHY 406 (for writing operations) or error-checking of retrieved primary data for return to the user interface ports 402 (for reading operations).

The command control portion 420 may be coupled to both the error control and data control portions 422, 424. For some embodiments, the command control portion 420 includes one or more digital circuits that implement functional logic for generating commands to actuate various primary data access operations of the data control portion 424. The command control portion 420 may include one or more suitable units for carrying out memory access operations responsive to memory transactions of user applications involving error checking error-checkable data words. These can include address translation and command translation functions involved in adaptively splitting the memory addressing of error checking data (e.g., ECC data) and primary data, which facilitates inline storage of primary data with associated error checking data.

Figure 5:
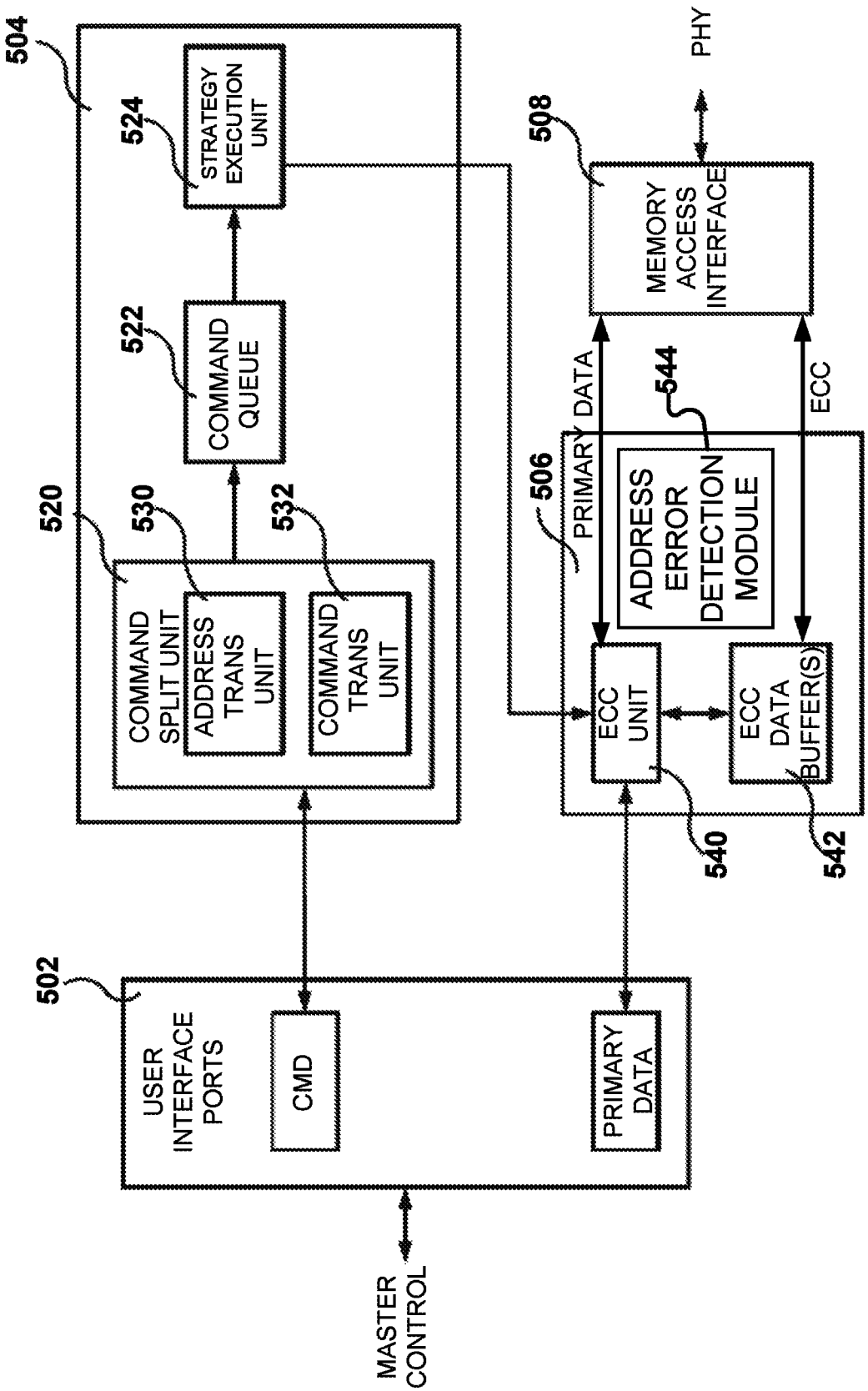
FIG. 5 is a diagram illustrating an example command control portion and an example error control portion of an example memory controller, in accordance with some embodiments.

FIG. 5 is a diagram illustrating an example command control portion 504 and an example error control portion 506 of an example memory controller, in accordance with some embodiments. FIG. 5 is described with respect to ECC data merely for illustrative purposes. Other parts of the command control portion 504, as well as of the error control portions 506, which are not shown or specifically described, may be of any suitable type known in the art configured to suit the particularly intended application. The command control portion 504 may comprise conventional capabilities such as use of control and execution logic for ECC, address shifting between user and memory-specific addresses, and address/command generation for error-checkable data words.

In FIG. 5, the master control operation may issue memory transactions in the form of memory commands for certain error-checkable data words to be operated on and the addresses for those error-checkable data words. The command control portion 504 may receive these addresses and commands (in the master control operation's formatting) through the user interface ports 502. When such addresses and commands are received, the command control portion 504 may execute to determine the proper memory access addresses respectively for the primary data and ECC data portions (upon generation or upon retrieval from memory) of the error-checkable data words in question. Based on the resulting data and ECC access addresses, the received commands are split (by a command split unit 520) to generate a sequence of multiple memory commands, at least one for the primary data portion, and at least one for the ECC data portion. The data address is suitably translated (by an address translation unit 530) to generate separate, mutually offset data and ECC access addresses, which correspond to separate memory commands for the primary data and ECC data portions of the error-checkable data words in question. The translated addresses are compatible with the particular inline storage configuration employed, with the primary data and ECC data portions sharing the memory space available on the chips of a memory device (e.g., of the memory 408).

The error-checkable data words of memory transactions in question are passed to the error control portion 506. The error control portion 506 includes an ECC unit 540 that implements a suitable error detection and correction technique, employing an ECC of predetermined format, for error checking error-checkable data words passed to the error control portion 506. The error control portion 506 includes an address error detection module 544, which may be at least similar to the address error detection module 112 described above with respect to FIG. 1. Accordingly, the address error detection module 544 may detect for one or more multiple data error conditions and cause the indication of an address error/fault with respect to a memory address used with a memory transaction based on detecting at least multiple data error conditions of interest.

The error control portion 506 also includes one or more ECC data buffers 542 for storing the error checking results of error checking error-checkable data words passed to the error control portion 506. During write operations of the memory transactions, associated ECC data portions may be generated for the error-checkable data words received from the master control operation through the user interface ports 502 by the error control portion 506. The ECC data portions of the error-checkable data words may be stored in the ECC data buffers 542 until accumulated for all data portions of the given write operation. When drawn from the ECC data buffer 542 thereafter, the associated ECC data portions and the primary data portions emerging from the error control portion 506 at that point may be addressed separately and subjected to separate write commands for mutually offset inline storage on a memory device. They may be passed to one or more suitable memory access interface 508 (e.g., of the data control portion 424) for passage to the PHY (e.g., 406).

During read operations of the memory transactions, the separately addressed data and ECC data portions of the error-checkable data words may be read through separate read commands from their mutually offset inline stored locations on a memory device, responsive to the translated data and ECC addresses and memory commands received for execution from the command control portion 504. The primary data portions read from the memory device may be passed through the memory access interface 508 to the error control portion 506, and the associated ECC data portions read from the memory device may be passed through the memory access interface 508 and stored in the ECC data buffers 542 until the primary data portions of the given read operation are read and ready for error check. The ECC data portions then may be passed from the ECC data buffers 542 to the error control portion 506 for error checking of the associated primary data portions. The checked (and possibly corrected) error-checkable data words may be returned to the master control operation through the user interface ports 502.

As shown, the command control portion 504 includes a command queue 522 that receives memory commands generated by the command split unit 520, and from which a strategy execution unit 524 draws memory commands for timely execution. The command queue 522 may receive and register memory commands from not only the master control operation (through the user interface ports 502 and the command split unit 520), but also from other functional units not shown. Depending on the embodiment, these include for example a built-in-self-test (BIST) unit, a scrubbing engine, and the like. The command queue 522 may receive and queue up respective primary data and ECC memory commands translated by the command split unit 520 from the command received from the master control operation.

The command split unit 520 may implement functional logic for restructuring and modifying the memory commands and associated addresses it receives. The command split unit 520 may provide the necessary translation of incoming addresses/commands for error-checkable data words to adaptively suit inline storage of associated ECC (i.e., error checking data) and primary data portions on an available memory device. Accordingly, the command split unit 520 may include an address translation unit 530 and a command translation unit 532. The address translation unit 530 may execute to apply a predefined mapping scheme to the data address received in user-addressable space, and map to separate addresses in memory-addressable space for the primary data portion and for the ECC data portion of each error-checkable data word. The address translation unit 530 may obtain separate primary data and ECC data access addresses by carrying out address shifting measures to generate addresses in terms of device-specific address parameters of a given memory device (e.g., to reflect the row, column, page, or other such storage cell arrangement/organization thereof).

As noted herein, for various embodiments, communication traffic includes memory commands and data that are transmitted in burst mode to facilitate higher data throughput. The command split unit 520 may enforce a predefined burst limit (set to a burst limit) for each memory command entered in the command queue 522. The command split unit 520 may also confirm acceptance of each command entry to the command queue 522 that satisfies the burst limit condition.

The command translation unit 532 may evaluate incoming commands to determine if they include a read, write, or read-modify-write data access operation based on address, length, and availability of data masking. The command translation unit 532 may further evaluate received memory commands to determine if the associated ECC access of the command includes a read, write, or read-modify-write operation based on similar criteria applicable to the ECC access. Based on such determinations, the command split unit 520 can split, or decompose, the received commands into corresponding memory command sequences that are placed in the command queue 522. For inline ECC data (i.e., error checking data) storage, the sequences include additional ECC read and/or write commands that are suitably generated as required from the received commands. The command translation unit 532 may implement suitable logic to split incoming memory commands accordingly into the appropriate set of primary data commands and generate their associated ECC data commands—such as reads, writes, and read-modify-writes. The command queue 522 may implement suitable command placement measures to ensure that memory command sequences containing matched primary data and ECC data commands are executed as in-order sequences that are not interrupted by other memory commands.

The command control portion 504 includes a strategy execution unit 524 coupled to the command queue 522. The strategy execution unit 524 may implement functional logic to select execution memory commands, from memory command entries accepted into the command queue 522, and direct selected memory commands to corresponding parts of the error control portion 506 and a data control portion (e.g., 424) for timely execution. In this way, the strategy execution unit 524 can issue accepted memory command entries of the command queue 522 burst by burst. Additionally, the strategy execution unit 524 can serve to hold a memory command entry under execution.

Address Mapping/Translation

In order to provide a contiguous address space, the ECC data storage in the memory (e.g., 408) may be mapped out of the primary data address space. With the memory space available in the memory logically partitioned, the ECC data bits may be stored in the upper or lower $\frac{1}{8}^{th}$ region of the memory space within each chip select of the memory. As the ECC data storage space in this dedicated region fills, the addressing may be configured to roll-over from one chip select to the next on a non-power-of-2 boundary. Suitable measures may be used in certain applications to reconcile non-power-of-2 memory devices to the address granularity needed to support inline ECC storage (e.g., decoding of the upper 3-bits in the address within each chip select).

ECC data storage may be performed on a per chip select (CS) basis, such that when the upper 3-bits of the address within a chip select are set to 3'b111 (that is, the 3 binary MSB's are set to the values' 1 1 1), the address points to a location within the partitioned ECC region of the memory space. All other addresses may point to a location within the primary data region of the memory space outside this partitioned ECC region. The primary memory decode may roll over to the next chip select when the $\frac{7}{8}^{th}$ boundary is crossed, and for systems with more than two chip selects, the boundary may use similar decoding at each boundary—$\frac{14}{8}^{th}$ boundary, $\frac{21}{8}$th boundary, etc. Inline ECC data storage may involve translation of the primary data address to memory device address, which may go beyond just masking, splitting, and/or concatenation of user address bits, as the user address for a specific CS may start at a non-power-of-two page address to avoid gaps in the user address space.

Inline ECC storage may also involve one or more ECC data accesses for each user-initiated command. The address and length of the ECC data accesses may be suitably computed from the user address and length. This can entail translation of the row address, column address, datapath address, and chip level CID (for stacked 3DS devices). The bank address may not be changed, unless a suitable bank offset is selectively enabled for optimized performance Command Translation Read and write commands (representing read and write primary data memory transactions) received at the user interface ports 502 may be from one byte in length to a certain other maximum command length supported by a particular embodiment. Commands may be sub-divided in the command split unit 520 based on factors such as page boundary crossings, wrap commands, read-modify-write commands, etc. For some embodiments, commands are split on ECC address range boundaries (e.g., an 8 primary data memory burst aligned boundary). For instance, the command split unit 520 may split primary data commands such that the ECC data required for the entire command in the command queue 522 is contained in a single memory burst The commands involving read and write received through the user interface ports 502 may be translated into a combination of read, write, and read-modify-write operations for both the primary data and ECC data portions of the error-protected/error-checkable data words to be operated on.

Figure 6:
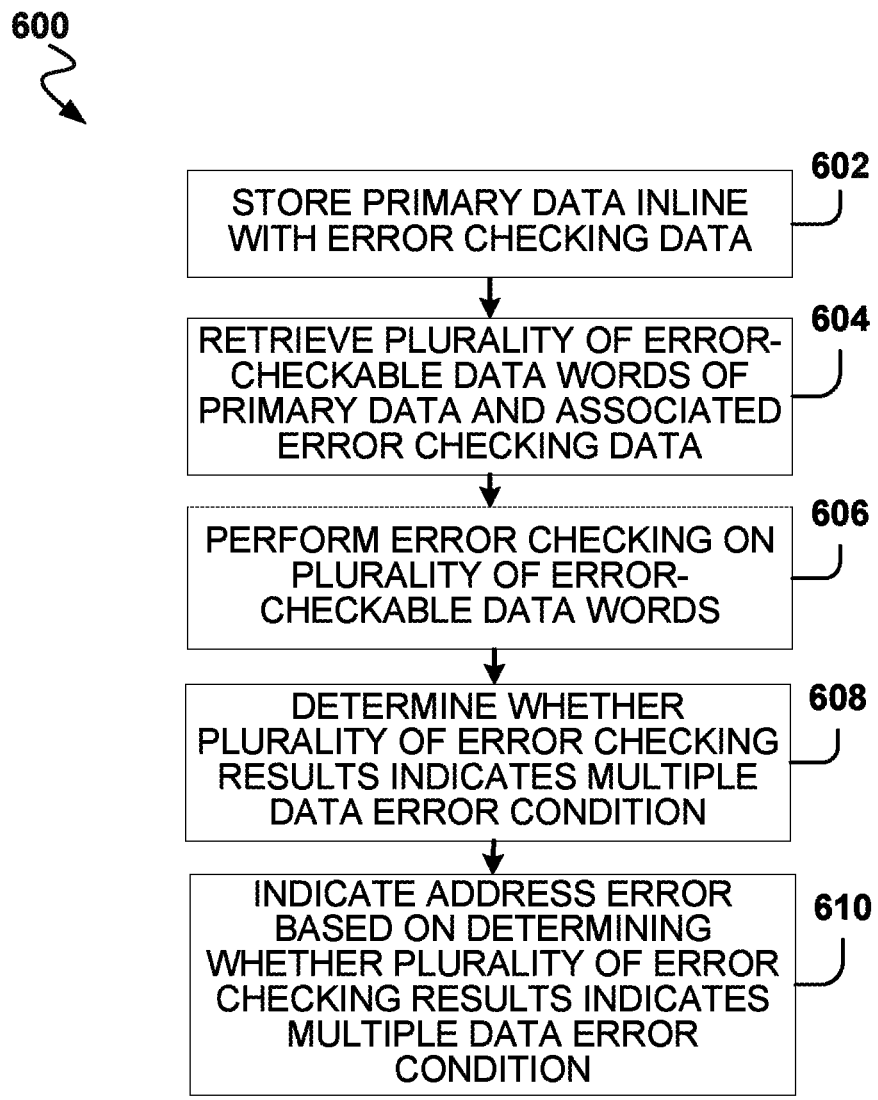
FIG. 6 is a flow diagram illustrating an example method for detecting an address error in a memory system storing primary data inline with error checking data, in accordance with various embodiments.

FIG. 6 is a flow diagram illustrating an example method 600 for detecting an address error in a memory system storing primary data inline with error checking data, in accordance with various embodiments. For some embodiments, the method 600 is performed by a memory controller of a memory system, such as the memory controller 106 described above with respect to FIG. 1. Though the steps of method 600 may be depicted and described in a certain order, the order in which the steps are performed may vary between embodiments. For example, a step may be performed before, after, or concurrently with another step. Additionally, the components described below with respect to the method 600 are merely examples of components that may be used with the method 600, and other components may also be used in some embodiments.

As shown in FIG. 6, the method 600 begins at operation 602, with the memory controller 106 causing primary data to be stored, on a memory device, inline with error checking data generated for the primary data using split addressing for memory transactions. The primary data may be stored on the memory device at a range of inline primary data addresses, while the error checking data may be stored on the memory device at a range of inline error checking data addresses, where the range of inline primary data addresses does not overlap with the range of inline error checking data addresses.

At operation 604, the memory controller 106 retrieves from the memory device, based on executing a memory transaction, a plurality of error-checkable data words of primary data and particular error checking data associated with the plurality of data words. Each error-checkable data word may, for example, comprise 64 bits of primary data. The memory transaction may comprise at least one of a read memory transaction, or a read-modify-write memory transaction. Additionally, a memory transaction may comprise at least one burst memory command (e.g., burst memory read command that reads eight 64-bit error-checkable data words of primary data).

At operation 606, the memory controller 106 performs error checking on the plurality of error-checkable data words (retrieved at operation 604) using the particular error checking data (retrieved at operation 604) to produce a plurality of error checking results. As noted herein, the error checking data may comprise ECC data bits, and the error checking may comprise performing an ECC check of each of the error-checkable data words using the respective ECC data bits.

At operation 608, the memory controller 106 determines whether the plurality of error checking results, produced at operation 606, indicates at least one multiple data error condition. The determining whether the plurality of error checking results indicates the at least one multiple data error condition may comprise receiving an interrupt (e.g., multiple ECC error interrupt) indicating a multiple data error.

For one example multiple data error condition, multiple data errors may be detected within a plurality of error-checkable data words of primary data that results from a single memory command, where, in the plurality of error-checkable data words, two or more error-checkable data words each have a separate single-bit error detected.

Accordingly, for some embodiments, the memory transaction comprises a single memory command that when executed causes the retrieving of the plurality of error-checkable data words from the memory device. For such embodiments, the determining whether the plurality of error checking results indicates that at least one multiple data error condition can comprise determining, based on the plurality of error checking results, whether each of two or more error-checkable data words, in the plurality of error-checkable data words, has at least a single-bit error. Additionally, the determining may comprise combining together (e.g., using logical OR operation(s)) the plurality of error checking results to produce a combined error checking result, each of the error checking results comprising one of no error, a correctable error, and an uncorrectable error, and counting the number of correctable errors and uncorrectable errors in the combined error checking result.

For another example multiple data error condition, multiple data errors may be detected within multiple error-checkable data words of primary data that results from a plurality of memory commands (e.g., back-to-back memory commands, such as by a burst mode memory command), where, in the plurality of memory commands, each memory command results in its own sub-plurality of data words within the plurality of data words, and at least two of those sub-pluralities each has a single-bit error detected.

Accordingly, for some embodiments, the memory transaction comprises a memory command that when executed cause the retrieval of the plurality of error-checkable data words from the memory device, where the plurality of error-checkable data words includes a first sub-plurality of error-checkable data words and a second sub-plurality of error-checkable data words (e.g., each sub-plurality of error-checkable data words comprises eight error-checkable data words). For such embodiments, the determining whether the plurality of error checking results indicates that at least one multiple data error condition can comprise determining, based on the plurality of error checking results, whether each of the first and second sub-pluralities of the error-checkable data words has at least a single-bit error.

At operation 610, the memory controller 106 indicates an address error with respect to the memory transaction based on the memory controller 106 determining, at operation 608, whether the plurality of error checking results indicates a multiple data error condition. As noted herein, an address error (e.g., erroneously mapping/translating of inline memory addresses) with respect to a memory command can result in a mismatch with respect to the primary data and error checking data being operated upon by the memory command.

Figure 7:
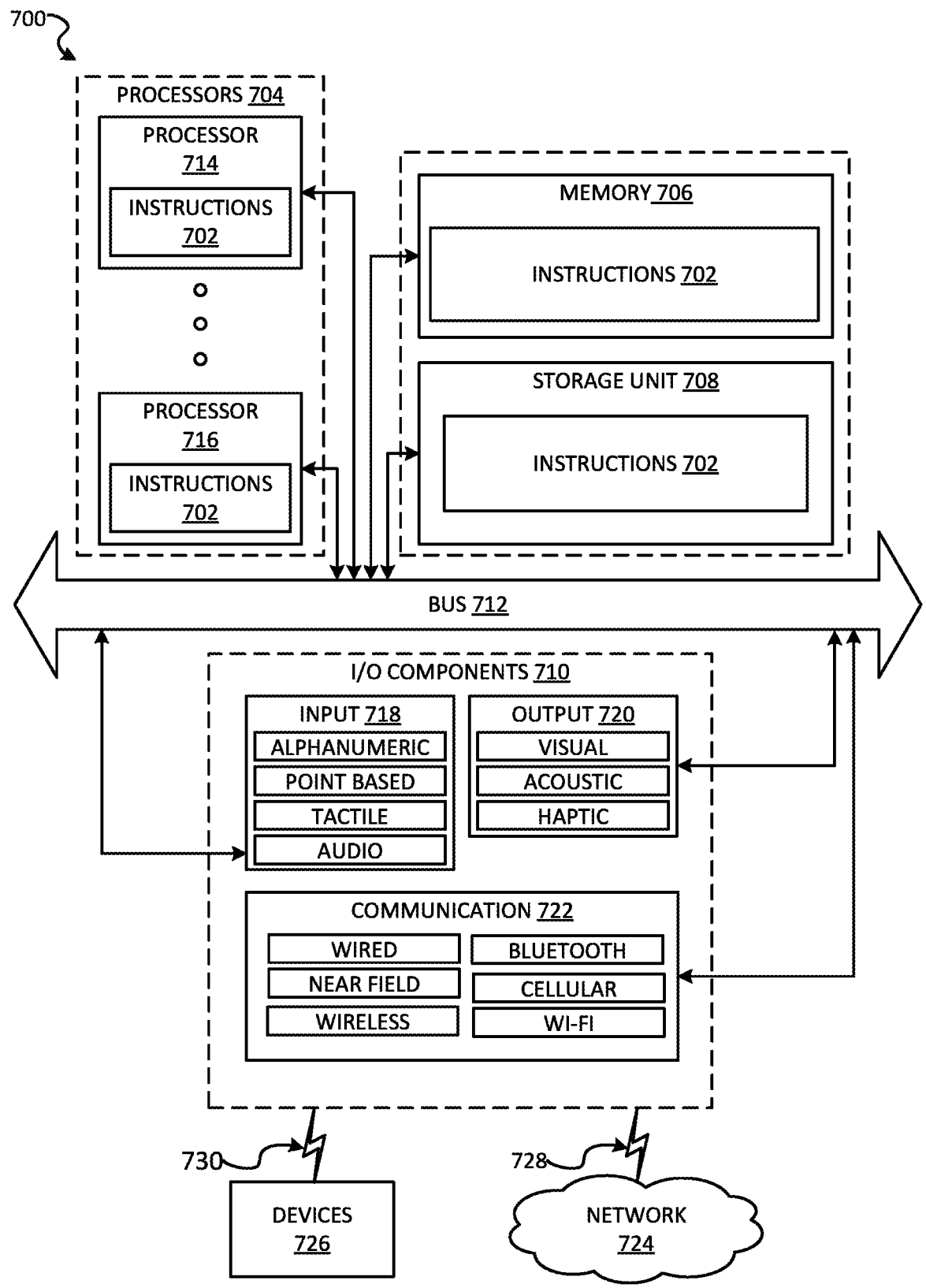
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a system, within which instructions 702 (e.g., software, a program, an application, an applet, an app, a driver, or other executable code) for causing the machine 700 to perform any one or more of the methodologies discussed herein may be executed. For example, the instructions 702 include executable code that causes the machine 700 to execute the method 400. In this way, these instructions 702 transform the general, non-programmed machine 700 into a particular machine programmed to carry out the described and illustrated method 600 in the manner described herein. The machine 700 may operate as a standalone device or may be coupled (e.g., networked) to other machines.

By way of non-limiting example, the machine 700 may comprise or correspond to a computer (e.g., a server computer, a client computer, a personal computer (PC), a tablet computer, a laptop computer, or a netbook), a mobile device, or any machine capable of executing the instructions 702, sequentially or otherwise, that specify actions to be taken by the machine 700. Further, while only a single machine 700 is illustrated, the term "machine" shall also be taken to include a collection of machines 700 that individually or jointly execute the instructions 702 to perform any one or more of the methodologies discussed herein.

The machine 700 may include processors 704, memory 706, a storage unit 708, and I/O components 710, which may be configured to communicate with each other such as via a bus 712. In an example embodiment, the processors 704 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 714 and a processor 716 that may execute the instructions 702. The term "processor" is intended to include multi-core processors 704 that may comprise two or more independent processors (sometimes referred to as "cores") that may execute instructions contemporaneously. Although FIG. 7 shows multiple processors, the machine 700 may include a single processor with a single core, a single processor with multiple cores (e.g., a multi-core processor), multiple processors with a single core, multiple processors with multiple cores, or any combination thereof.

The memory 706 (e.g., a main memory or other memory storage) and the storage unit 708 are both accessible to the processors 704 such as via the bus 712. The memory 706 and the storage unit 708 store the instructions 702 embodying any one or more of the methodologies or functions described herein. The instructions 702 may also reside, completely or partially, within the memory 706, within the storage unit 708, within at least one of the processors 704 (e.g., within the processor's cache memory), or any suitable combination thereof, during execution thereof by the machine 700. Accordingly, the memory 706, the storage unit 708, and the memory of the processors 704 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 702. The term "machine-readable medium" shall also be taken to include any medium, or combination of multiple media, that is capable of storing instructions (e.g., instructions 702) for execution by a machine (e.g., machine 700), such that the instructions, when executed by one or more processors of the machine (e.g., processors 704), cause the machine to perform any one or more of the methodologies described herein (e.g., method 400). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 710 may include a wide variety of components to receive input, provide output, produce output, transmit information, exchange information, capture measurements, and so on. The specific I/O components 710 that are included in a particular machine 700 will depend on the type of the machine 700. For example, portable machines such as mobile phones will likely include a touch input device or other such input mechanisms, while a headless server machine will likely not include such a touch input device. It will be appreciated that the I/O components 710 may include many other components that are not specifically shown in FIG. 7. The I/O components 710 are grouped according to functionality merely for simplifying the following discussion and the grouping is in no way limiting. In various example embodiments, the I/O components 710 may include input components 718 and output components 720. The input components 718 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components, and the like. The output components 720 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 710 may include communication components 722 operable to couple the machine 700 to a network 724 or devices 726 via a coupling 728 and a coupling 730 respectively. For example, the communication components 722 may include a network interface component or another suitable device to interface with the network 724. In further examples, the communication components 722 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 726 may be another machine or any of a wide variety of peripheral devices.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network 724 (e.g., the Internet) and via one or more appropriate interfaces (e.g., APIs).

Electronic Apparatus and System

Example embodiments may be implemented in digital electronic circuitry, in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Figure 8:
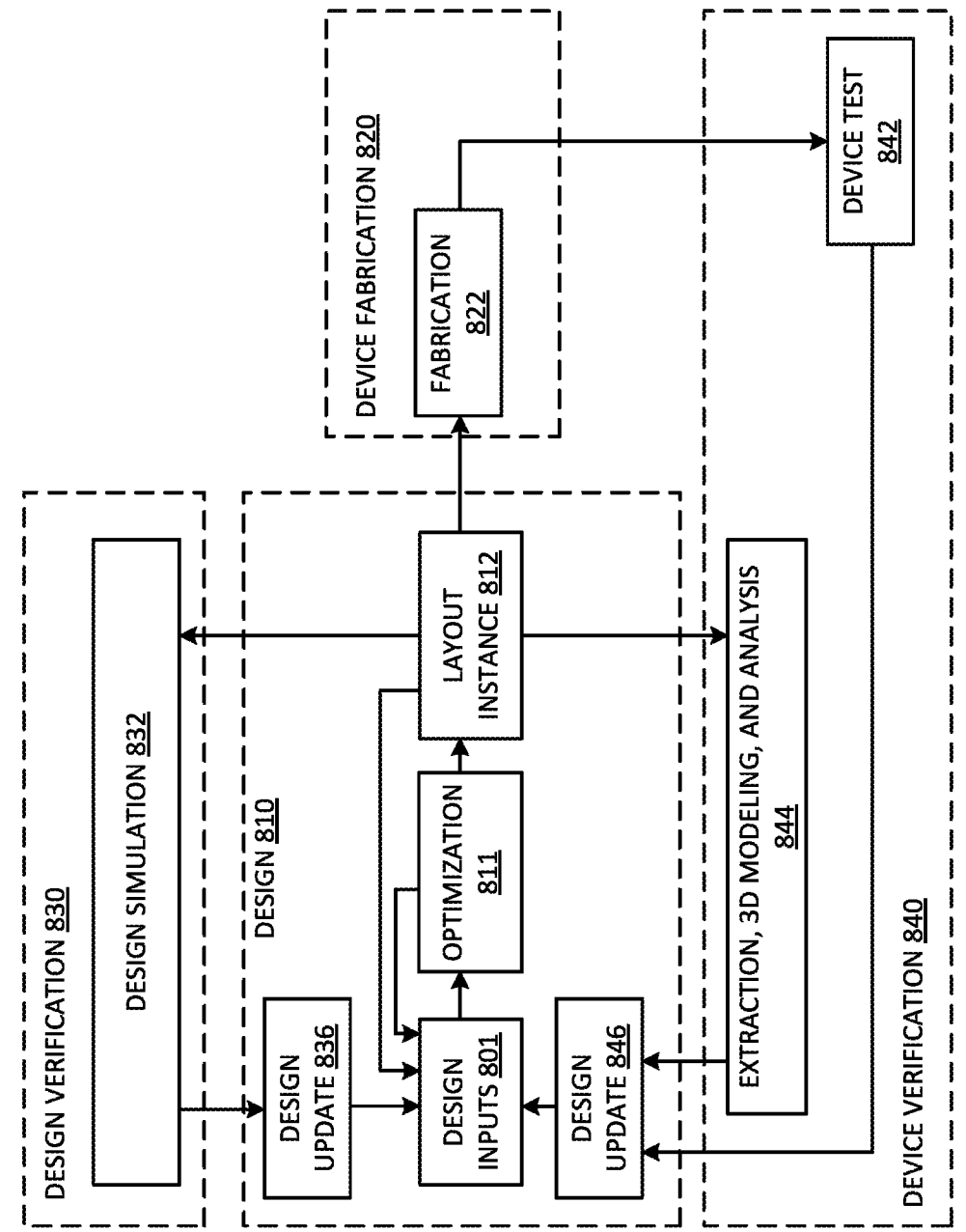
FIG. 8 is a diagram illustrating one possible design process flow for generating a circuit, including embodiments to implement a memory controller that supports detecting an address error in a memory system storing primary data inline with error checking data as described herein, and in various embodiments, to integrate the memory controller with a larger integrated circuit comprising different design blocks.

FIG. 8 is a diagram illustrating one possible design process flow for generating a circuit, including embodiments to implement a memory controller that supports detecting an address error in a memory system storing primary data inline with error checking data as described herein, and in various embodiments, to integrate the memory controller with a larger integrated circuit comprising different design blocks. As illustrated, the overall design flow 800 includes a design phase 810, a device fabrication phase 820, a design verification phase 830, and a device verification phase 840. The design phase 810 involves an initial design input operation 801 where the basic elements and functionality of a device are determined, as well as revisions based on various analyses and optimization of a circuit design. This design input operation 801 is where instances of an EDA circuit design file are used in the design and any additional circuitry is selected. The initial strategy, tactics, and context for the device to be created are also generated in the design input operation 801, depending on the particular design algorithm to be used.

In some embodiments, following an initial selection of design values in the design input operation 801, timing analysis and optimization according to various embodiments occurs in an optimization operation 811, along with any other automated design processes. One such process may be the automated design of a partitioned root search for error locator polynomial functions in RS FEC decoding. As described below, design constraints for blocks of a circuit design generated with design inputs in the design input operation 801 may be analyzed using hierarchical timing analysis, according to various embodiments. While the design flow 800 shows such optimization occurring prior to a layout instance 812, such hierarchical timing analysis and optimization may be performed at any time to verify operation of a circuit design. For example, in various embodiments, constraints for blocks in a circuit design may be generated prior to routing of connections in the circuit design, after routing, during register transfer level (RTL) operations, or as part of a final signoff optimization or verification prior to a device fabrication operation 822.

After design inputs are used in the design input operation 801 to generate a circuit layout, and any optimization operations 811 are performed, a layout is generated in the layout instance 812. The layout describes the physical layout dimensions of the device that match the design inputs. This layout may then be used in the device fabrication operation 822 to generate a device, or additional testing and design updates may be performed using designer inputs or automated updates based on design simulation 832 operations or extraction, 3D modeling and analysis 844 operations. Once the device is generated, the device can be tested as part of device test 842 operations, and layout modifications generated based on actual device performance.

As described in more detail below, design updates 836 from the design simulation 832, design updates 846 from the device test 842 or the 3D modeling and analysis 844 operations, or the design input operation 801 may occur after an initial layout instance 812 is generated. In various embodiments, whenever design inputs are used to update or change an aspect of a circuit design, a timing analysis and optimization operation 811 may be performed.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method comprising:
   storing, on a memory device, primary data inline with error checking data generated for the primary data using split addressing for memory transactions, the primary data being stored on the memory device at a range of inline primary data addresses, and the error checking data being stored on the memory device at a range of inline error checking data addresses, the range of inline primary data addresses not overlapping with the range of inline error checking data addresses;
   retrieving from the memory device, based on executing a memory transaction, a plurality of error-checkable data words of primary data and particular error checking data associated with the plurality of error-checkable data words;
   performing error checking on the plurality of error-checkable data words using the particular error checking data to produce a plurality of error checking results;
   determining whether the plurality of error checking results indicates at least one multiple data error condition; and
   indicating an address error with respect to the memory transaction based on the determining whether the plurality of error checking results indicates a multiple data error condition.

2. The method of claim 1, wherein the memory transaction comprises a single memory command that, when executed, causes the retrieving of the plurality of error-checkable data words from the memory device, and the determining whether the plurality of error checking results indicates the at least one multiple data error condition comprises:
   determining, based on the plurality of error checking results, whether each of two or more error-checkable data words, in the plurality of error-checkable data words, has at least a single-bit error.

3. The method of claim 2, wherein the determining whether the plurality of error checking results indicates the at least one multiple data error condition further comprises:
   combining together the plurality of error checking results to produce a combined error checking result, each of the error checking results comprising one of no error, a correctable error, and an uncorrectable error; and
   counting the number of correctable errors and uncorrectable errors in the combined error checking result.

4. The method of claim 1, wherein the memory transaction comprises a memory command that when executed causes the retrieving of the plurality of error-checkable data words from the memory device, the plurality of error-checkable data words at least includes a first sub-plurality of error-checkable data words and a second sub-plurality of error-checkable data words, and the determining whether the plurality of error checking results indicates the at least one multiple data error condition comprises:
   determining, based on the plurality of error checking results, whether each of the first and second sub-pluralities of the error-checkable data words has at least a single-bit error.

5. The method of claim 4, wherein each sub-plurality of error-checkable data words comprises eight error-checkable data words.

6. The method of claim 1, wherein the memory transaction comprises at least one of a read memory transaction, a write memory transaction, or a read-modify-write memory transaction.

7. The method of claim 1, wherein the memory transaction comprises at least one burst memory command.

8. The method of claim 1, wherein the error checking data comprises error correcting code (ECC).

9. The method of claim 1, wherein the determining whether the plurality of error checking results indicates the at least one multiple data error condition comprises:
receiving an interrupt indicating a multiple data error.

10. The method of claim 1, wherein each error-checkable data word comprises 64 bits of primary data.

11. A memory controller comprising:
an error checking portion configured to perform error checking of an error-checkable word of primary data based on associated error checking data; and
an address error detection portion configured to detect an address error with respect to a memory transaction;
wherein the memory controller uses split addressing for memory transactions to store primary data inline with error checking data on a memory device, the primary data being stored on the memory device at a range of inline primary data addresses and the error checking data being stored on the memory device at a range of inline error checking data addresses, the range of inline primary data addresses not overlapping with the range of inline error checking data addresses, and the memory controller performing operations comprising:
retrieving from the memory device, based on executing the memory transaction, a plurality of error-checkable data words of primary data and particular error checking data associated with the plurality of error-checkable data words;
performing, by the error checking portion, error checking on the plurality of error-checkable data words using the particular error checking data to produce a plurality of error checking results;
determining, by the address error detection portion, whether the plurality of error checking results indicates at least one multiple data error condition;
indicating, by the address error detection portion, the address error with respect to the memory transaction based on the determining whether the plurality of error checking results indicates a multiple data error condition.

12. The memory controller of claim 11, wherein the memory transaction comprises a single memory command that when executed causes the retrieving of the plurality of error-checkable data words from the memory device, and the determining whether the plurality of error checking results indicates the at least one multiple data error condition comprises:
determining, based on the plurality of error checking results, whether each of two or more error-checkable data words, in the plurality of error-checkable data words, has at least a single-bit error.

13. The memory controller of claim 12, wherein the determining whether the plurality of error checking results indicates the at least one multiple data error condition further comprises:
combining together the plurality of error checking results to produce a combined error checking result, each of the error checking results comprising one of no error, a correctable error, and an uncorrectable error; and
counting the number of correctable errors and uncorrectable errors in the combined error checking result.

14. The memory controller of claim 11, wherein the memory transaction comprises a memory command that when executed causes the retrieving of the plurality of error-checkable data words from the memory device, the plurality of error-checkable data words at least includes a first sub-plurality of error-checkable data words and a second sub-plurality of error-checkable data words, and the determining whether the plurality of error checking results indicates the at least one multiple data error condition comprises:
determining, based on the plurality of error checking results, whether each of the first and second sub-pluralities of the error-checkable data words has at least a single-bit error.

15. The memory controller of claim 14, wherein each sub-plurality of error-checkable data words comprises eight error-checkable data words.

16. The memory controller of claim 11, wherein the memory transaction comprises at least one of a read memory transaction, or a read-modify-write memory transaction.

17. The memory controller of claim 11, wherein the memory transaction comprises at least one burst memory command.

18. The memory controller of claim 11, wherein the error checking data comprises error correcting code (ECC).

19. The memory controller of claim 11, wherein the determining whether the plurality of error checking results indicates at least one multiple data error condition comprises:
receiving an interrupt indicating a multiple data error.

20. A memory system comprising:
a memory device;
a memory controller coupled to the memory device and configured to perform operations comprising:
storing, on the memory device, primary data inline with error checking data generated for the primary data using split addressing for memory transactions, the primary data being stored on the memory device at a range of inline primary data addresses and the error checking data being stored on the memory device at a range of inline error checking data addresses, the range of inline primary data addresses not overlapping with the range of inline error checking data addresses;
retrieving from the memory device, based on executing a memory transaction, a plurality of error-checkable data words of primary data and particular error checking data associated with the plurality of error-checkable data words;
performing error checking on the plurality of error-checkable data words using the particular error checking data to produce a plurality of error checking results;
determining whether the plurality of error checking results indicates at least one multiple data error condition; and
indicating an address error with respect to the memory transaction based on the determining whether the plurality of error checking results indicates a multiple data error condition.

* * * * *